(12) United States Patent
Nannoni et al.

(10) Patent No.: US 8,113,461 B2
(45) Date of Patent: Feb. 14, 2012

(54) HELICOPTER

(75) Inventors: Fabio Nannoni, Novara (IT); Dante Ballerio, Caronno Varesino (IT); Alessandro Scandroglio, Oleggio (IT)

(73) Assignee: Agusta S.p.A., Samarate (IT)

( * ) Notice: Subject to any disclaimer, the term of this patent is extended or adjusted under 35 U.S.C. 154(b) by 373 days.

(21) Appl. No.: 12/481,215

(22) Filed: Jun. 9, 2009

(65) Prior Publication Data

US 2010/0230530 A1    Sep. 16, 2010

(30) Foreign Application Priority Data

Jun. 10, 2008   (EP) ..................................... 08425408

(51) Int. Cl.
  *B64C 27/04* (2006.01)
  *B64C 21/06* (2006.01)
  *B64D 33/02* (2006.01)
(52) U.S. Cl. ..................... 244/17.11; 244/53 B; 244/209
(58) Field of Classification Search ............... 244/17.11, 244/17.19, 53 B, 208, 209; 138/37, 39, 42; 137/15.1

See application file for complete search history.

(56) References Cited

U.S. PATENT DOCUMENTS

| 2,699,906 | A | * | 1/1955 | Lee et al. ..................... 244/53 B |
| 3,517,898 | A | * | 6/1970 | Laville et al. .................. 244/7 R |
| 4,830,312 | A |   | 5/1989 | Hain et al. |
| 5,697,394 | A |   | 12/1997 | Smith et al. |
| 5,987,877 | A |   | 11/1999 | Steiner |

FOREIGN PATENT DOCUMENTS

GB   1 201 096 A   8/1970

* cited by examiner

*Primary Examiner* — Timothy D Collins
*Assistant Examiner* — Nicholas McFall
(74) *Attorney, Agent, or Firm* — Berenato & White, LLC (57) ABSTRACT

A helicopter comprising a drive having an air intake conduit, a main rotor connected functionally to the drive and a transmission interposed functionally between the main rotor and the drive and housed in a housing. The helicopter further comprises at least one air intake having a first inlet fluidly connected to the intake conduit, at least one second inlet fluidly connected to the housing and deflecting means interacting, in use, with an airflow to divide the airflow into a first and a second airflow. The air intake also has guide means for guiding the first airflow along a first path extending from the deflecting means to the first inlet, and for guiding the second airflow along a second path separate from the first path and extending from the deflecting means to the second inlet.

10 Claims, 6 Drawing Sheets

HELICOPTER

This application claims benefit under 35 U.S.C. §119 of European patent application Ser. No. 08/425,408 filed on Jun. 10, 2008, which disclosure is hereby incorporated by reference.

TECHNICAL FIELD OF THE INVENTION

The present invention relates to a helicopter.

BACKGROUND OF THE INVENTION

Helicopters are known substantially comprising a fuselage; a main rotor rotating about a first axis and fitted to a top portion of the fuselage; and an antitorque rotor located at the tail end of the helicopter and rotating about a second axis crosswise to the first.

Known helicopters also comprise at least one engine; and a transmission for transmitting motion from the engine to the main rotor.

More specifically, the engine has an intake conduit for a first airflow of fresh air from the outside; and an exhaust conduit for externally discharging high-temperature burnt gas.

The helicopter also comprises a transmission housing; and an inlet connecting the housing to the outside to produce a second airflow of fresh air by which to cool the transmission either directly or with the interposition of a radiator.

The thermodynamic efficiency of the engine and transmission cooling efficiency are affected by the attitude, and particularly the yaw angle, of the helicopter.

That is, flow of the first and second airflow vary alongside variations in the yaw angle of the helicopter.

Variations in yaw angle also affect the degree of turbulence in the first airflow, thus affecting the thermodynamic efficiency of the engine.

A need is felt within the industry to achieve as constant a flow as possible of the first and second airflow, and to minimize turbulence in the first airflow over a wide attitude range, so as to achieve optimum thermodynamic efficiency of the engine and effectively cool the transmission within said range.

SUMMARY OF THE INVENTION

It is an object of the present invention to provide a helicopter designed to achieve this in a straightforward, low-cost manner.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
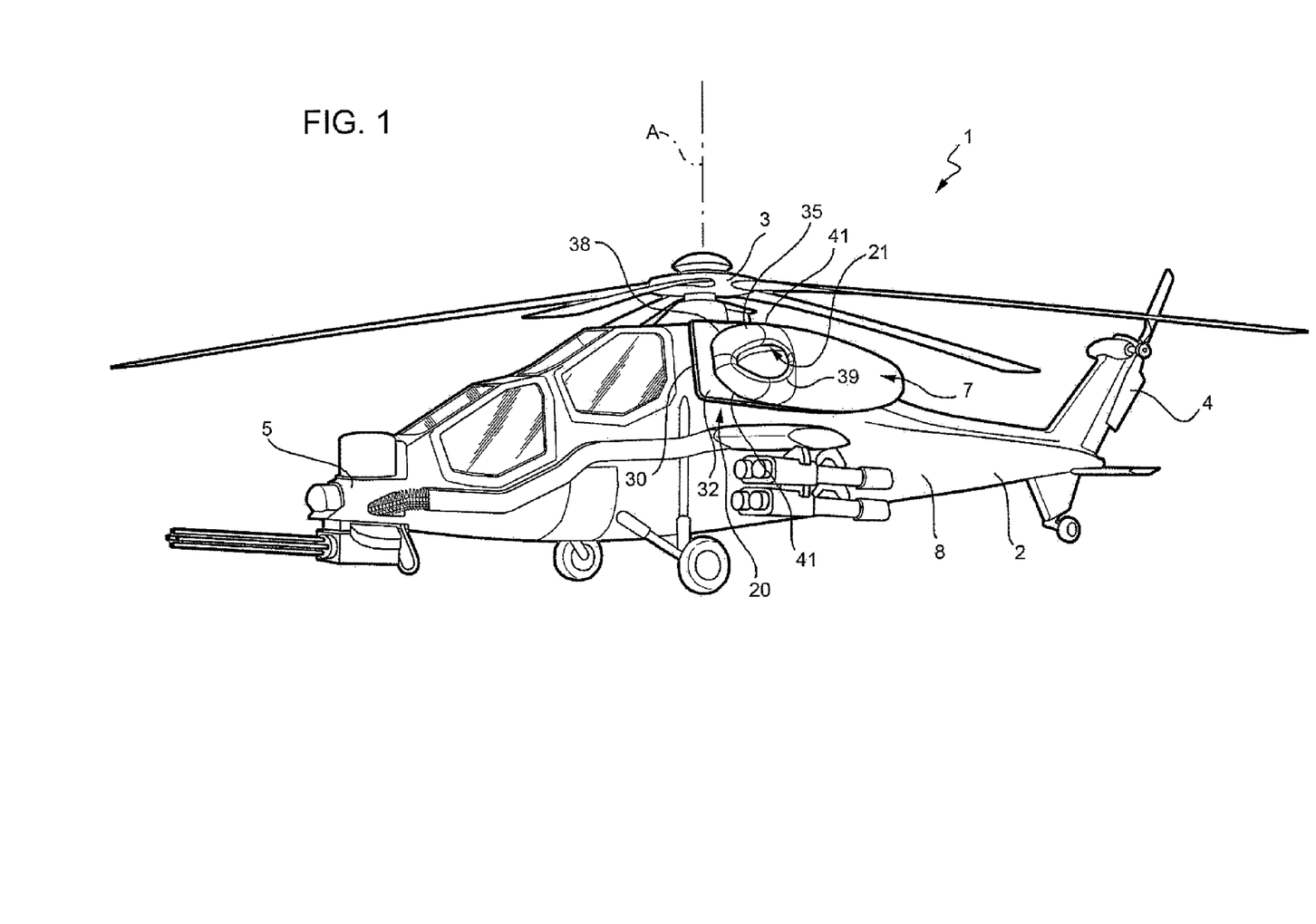
FIG. 1 shows a schematic of a helicopter in accordance with the invention.

Number 1 in FIG. 1 indicates a helicopter substantially comprising a fuselage 2 with a nose 5; a main rotor 3 fitted to the top of fuselage 2 and rotating about an axis A; and a tail rotor 4 fitted to a tail fin projecting from fuselage 2 at the opposite end to nose 5, and rotating about a second axis crosswise to axis A.

Helicopter 1 comprises two engines 6 (only one shown in FIG. 6) housed in respective housings defined by a supporting body 7 and located alongside respective sides 8 of fuselage 2.

Figure 4:
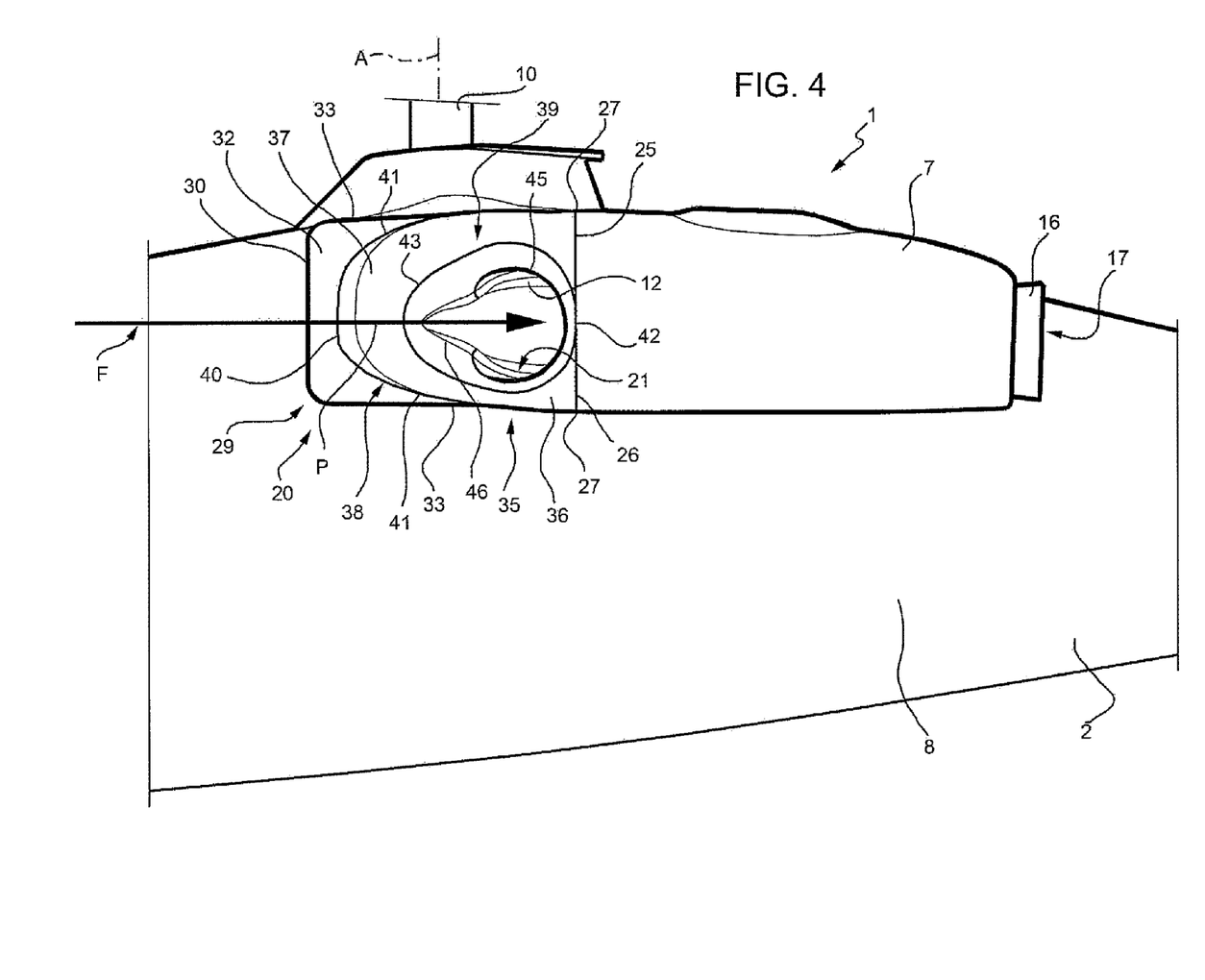
FIG. 4 shows a side view of the FIGS. 2 and 3 air intake.
Figure 5:
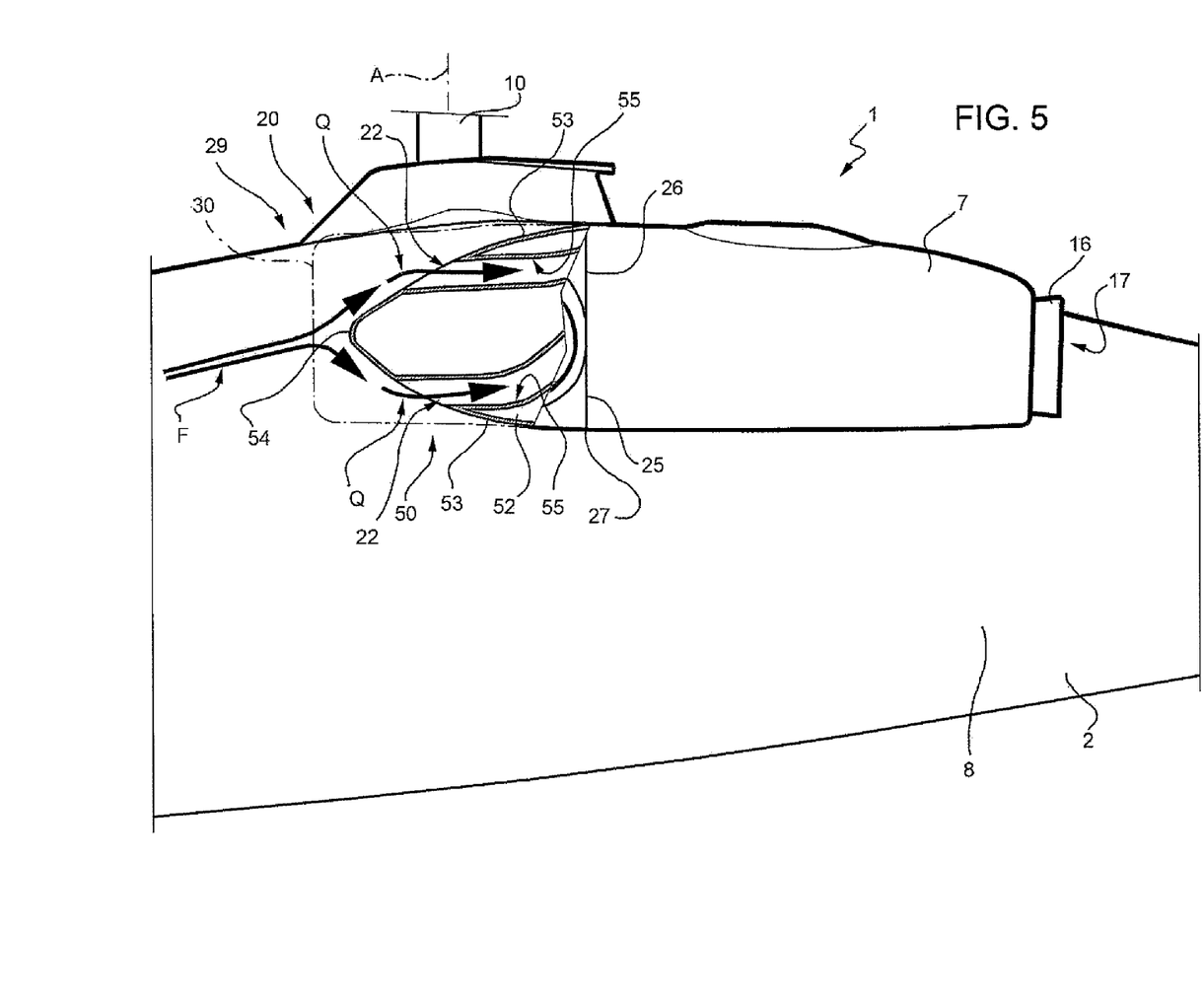
FIG. 5 shows a side view of the FIGS. 2 and 3 air intake with parts removed for clarity.

Helicopter 1 comprises two transmissions 9 (only one shown in FIG. 6) connecting the output shafts of respective engines 6 to a shaft 10 (only shown partly in FIGS. 3, 4, 5) for rotating main rotor 3 about axis A. More specifically, the output shafts of engines 6 extend along respective axes B (only one shown in FIG. 6).

Figure 6:
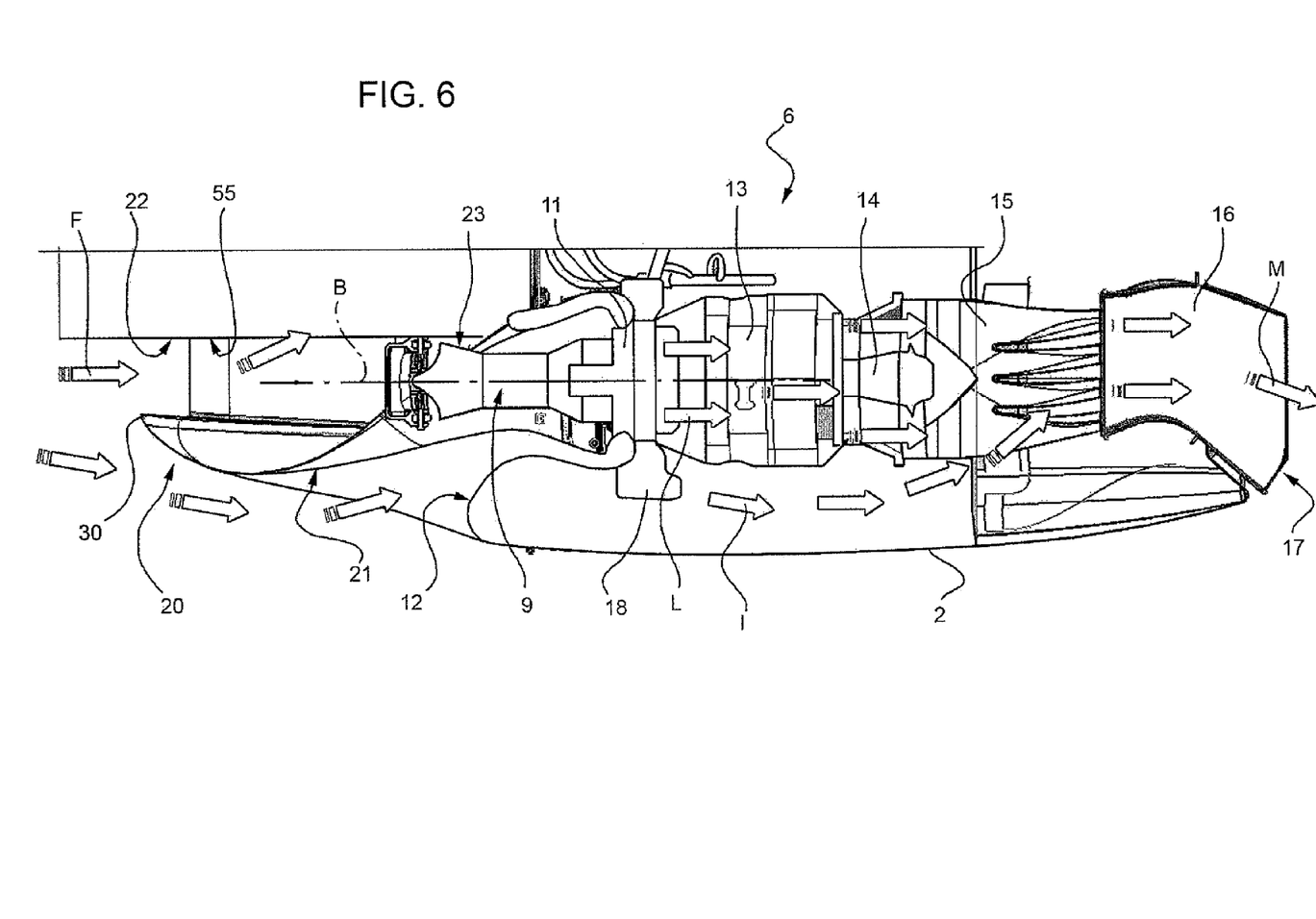
FIG. 6 shows an operating diagram, with parts removed for clarity, of an engine of the FIG. 1 helicopter and of a section of the FIG. 2-5 air intake.

Each engine 6 performs in the same way as an open-thermodynamic-cycle gas turbine, and substantially comprises (FIG. 6):

a compressor 11 having a fresh-air intake conduit 12 and for compressing the fresh-air intake;

a combustion chamber 13 in which the air compressed by compressor 11 reacts with a fuel to produce high-temperature burnt gas; and a turbine 14 in which the high-temperature burnt gas from combustion chamber 13 expands to rotate the output shaft of engine 6.

Each engine 6 also comprises:

a convergent nozzle 15 downstream from turbine 14 to accelerate the burnt gas; and an exhaust conduit 16 for discharging the burnt gas and terminating in a respective opening 17 in supporting body 7.

For each engine 6, helicopter 1 advantageously comprises an air intake 20, in turn comprising:

a first inlet 21 fluidly connected to conduit 12;

two inlets 22 fluidly connected to a housing 23 (FIG. 6) housing transmission 9;

deflecting means interacting, in use, with an airflow F outside helicopter 1 (FIGS. 2 to 5) to divide the airflow into a first and second airflow; and guide means for guiding the first airflow along a first path P (FIGS. 2 to 5) extending from the deflecting means to inlet 21, and for guiding the second airflow along two second paths Q (FIGS. 2 and 5) separate from path P and extending from the deflecting means to inlets 22.

It should be pointed out that "separate" is intended here to mean that paths P and Q of the first and second airflow at no point intersect downstream from the deflecting means.

More specifically, air intakes 20 are located alongside respective sides 8, and project towards nose 5 from a front end 25 of supporting body 7 facing nose 5.

More specifically, end 25 of supporting body 7 has two edges 26 alongside fuselage 2; and two edges 27 extending crosswise to fuselage 2 and between respective facing ends of edges 26.

Air intakes 20 are preferably integral with each other.

Air intakes 20 obviously being identical, only one is described below for the sake of simplicity.

In the example shown in the drawings, air intake 20 comprises (FIGS. 2 to 5):

a flat wall 29 which has a free end edge 30 at the opposite end to end 25, and defines a surface 31 facing fuselage 2, and a surface 32 on the opposite side to surface 31;

a wall 35 comprising an end portion 36 cooperating with end 25; and a main portion 37 cooperating with surface 32 and defining inlet 21; and a wall 50 (FIG. 2) comprising an end portion 51 cooperating with end 25; and a main portion 52 interposed between surface 32 and relative side 8, and defining inlets 22.

More specifically, the deflecting means are defined by edge 30 which performs substantially in the same way as the leading edge of a wing to divert the first and second airflow onto surfaces 32 and 31 respectively of wall 29.

In addition to edge 30, the contour of wall 29 is also defined by two edges 33 converging in edge 30 in the direction from end 25 to edge 30.

Main portion 37 of wall 35 extends from end portion 36 towards nose 5 of fuselage 2.

End portion 36 is larger than main portion 37 in a direction parallel to edge 27, and is smaller than main portion 37 lengthwise of fuselage 2.

Figure 2:
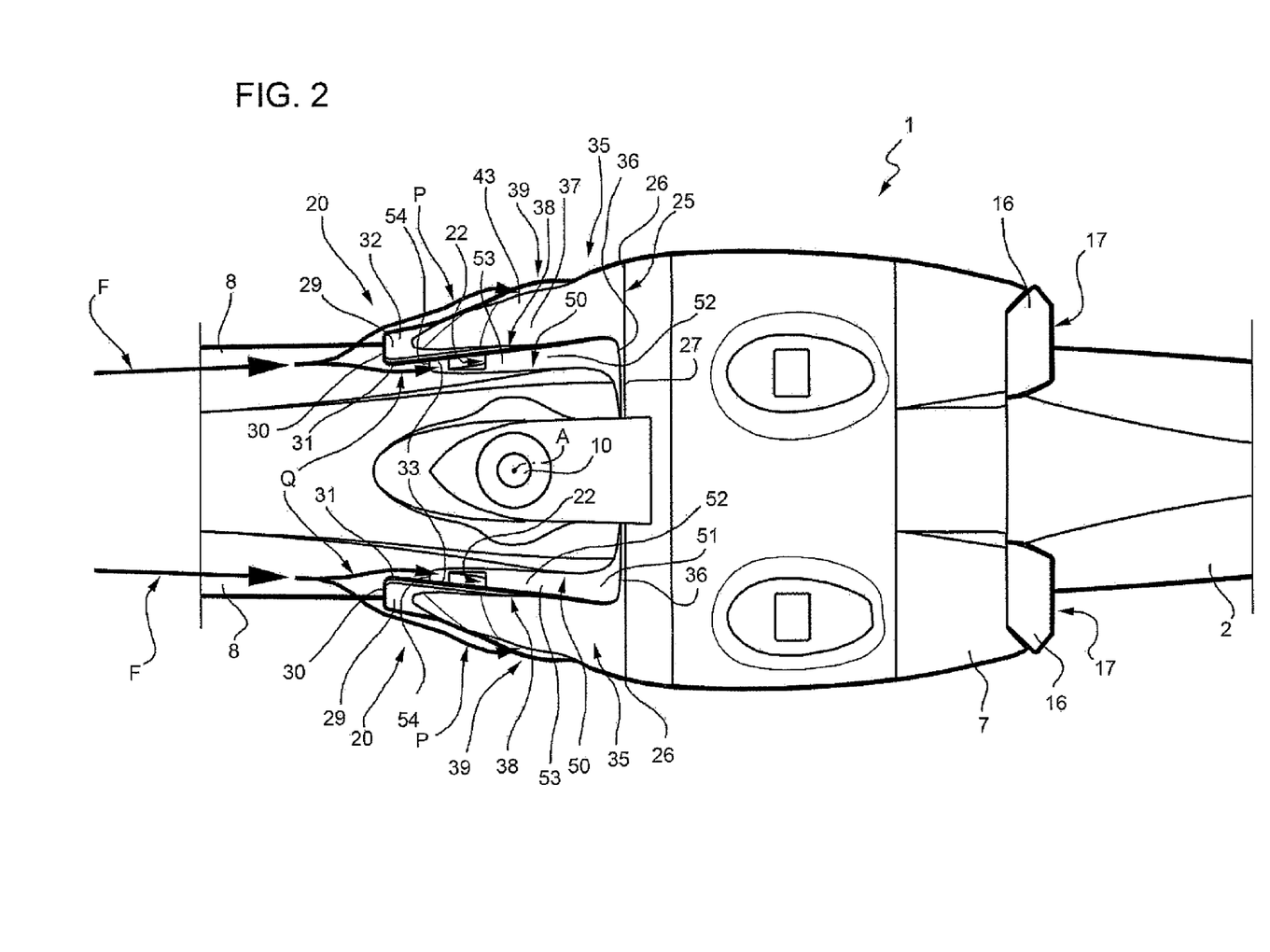
FIG. 2 shows a top plan view of an air intake of the FIG. 1 helicopter.

End portion 36 of each wall 35 is integral with end portion 36 of the other wall 35 (FIG. 2).

Main portion 37 has a curved first end edge 38 cooperating with surface 32; and a curved second edge 39 opposite edge 38 and at a distance from surface 32.

More specifically (FIGS. 3, 4) edge 38 comprises an end portion 40 parallel to edge 30 and interposed between edge 30 and end portion 36; and two portions 41 converging towards edge 30 in the direction from end portion 36 to edge 30.

Portions 41 are located on opposite sides of portion 40.

Edge 39 is curved and substantially comprises an arc-shaped portion 42 on the side facing end 25; and a portion 43 elongated towards edge 30, connected to portion 42, and located on the side facing portion 40.

More specifically (FIGS. 3, 4), portion 42 extends along an arc of roughly 180°, and portion 43 is located outside the sector subtended by portion 42.

As shown in FIG. 2, edge 39 extends obliquely with respect to axis A.

The contour of inlet 21 comprises an arc-shaped first portion 45; and a second portion 46 defining a tip located outside the circumference defined by portion 45.

Portion 45 is located on the side facing end 25, and portion 46 on the side facing portion 40.

More specifically, portion 46 comprises two segments converging in the direction from portion 45 to portion 40, and having first ends connected to respective ends of portion 45, and second ends opposite the first ends and connected to each other.

Portion 46 is located outside the sector defined by portion 45.

Inlet 21 is closer than edge 39 to surface 32.

Figure 3:
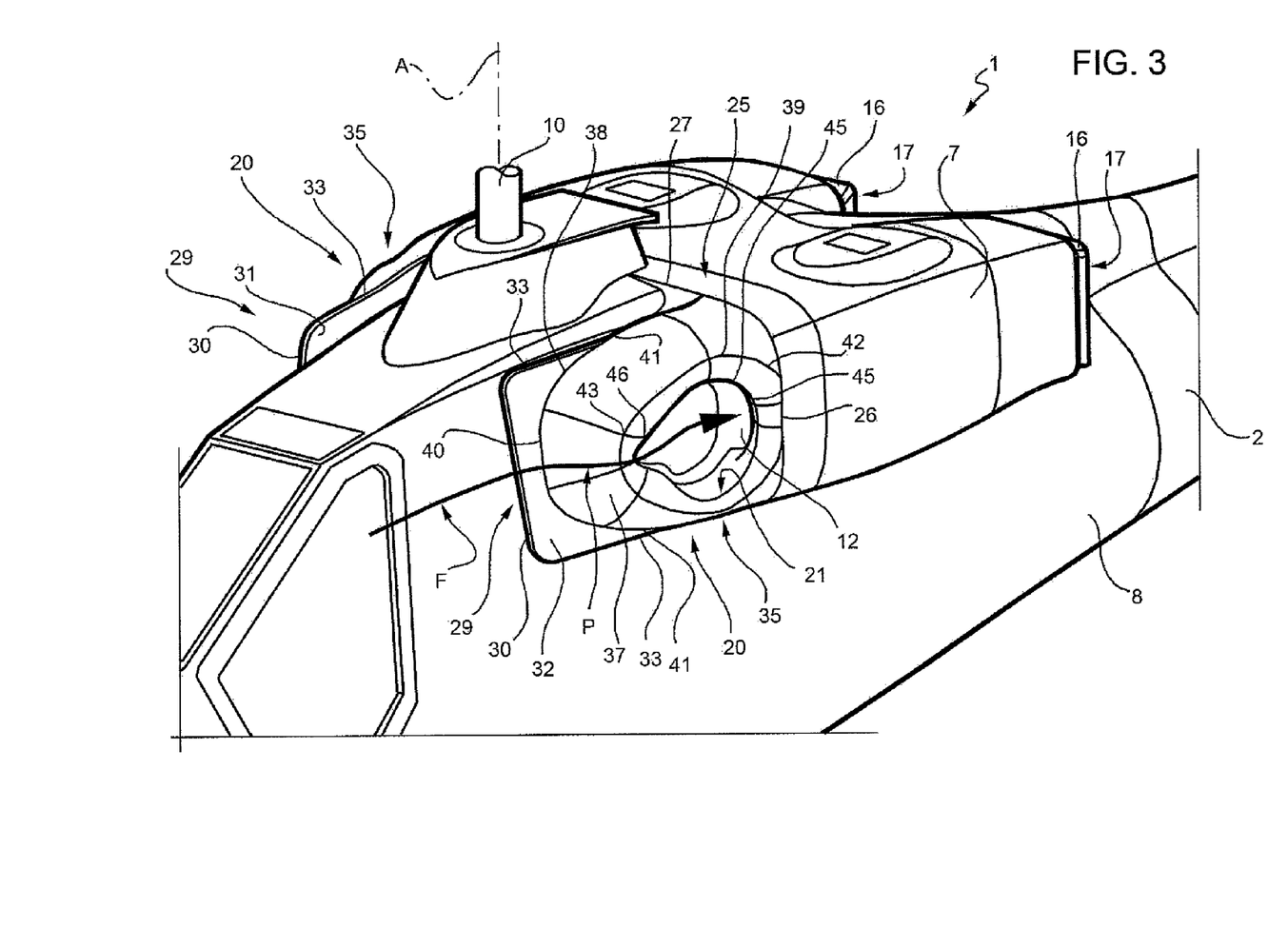
FIG. 3 shows a larger-scale side view in perspective of the FIG. 2 air intake.

More specifically, main portion 37 of edge 35 extends at increasing distances from surface 32 in the direction from edge 38 to edge 39, and at decreasing distances from surface 32 in the direction from edge 39 to inlet 21 (FIG. 3).

In other words, the thickness of main portion 37 increases in the direction from edge 38 to edge 39, and decreases in the direction from edge 39 to inlet 21.

The projection of the contour of inlet 21 onto surface 32 lies within the projection of the contour of edge 39 onto surface 32.

The projection of the contour of edge 39 onto surface 32 lies within edge 38.

The projections of portions 45, 46 of inlet 21 onto surface 32 are surrounded by the projections of portions 42, 43 onto surface 32.

The main portion 52 of wall 50 comprises two surfaces 53 defining respective inlets 22 and converging in a rounded edge 54 in the direction from end portion 51 to edge 30 of wall 29.

Inlets 22 in the example shown are rectangular and open into respective conduits 55 (FIG. 5) terminating inside housing 23 of transmission 9 (FIG. 6).

More specifically, edge 54 is interposed between end 25 and edge 30.

The guide means of each air intake 20 comprise:

surface 32, and the portion of wall 35 interposed between edge 30 and inlet 21 and for guiding the first airflow along path P from edge 30 to inlet 21; and surface 31, and the portions of surfaces 53 interposed between edge 30 and inlets 22 and for guiding the second airflow along paths Q from edge 30 to inlets 22.

More specifically, each path Q is bounded laterally by a relative side 8 and by a relative surface 31, and each path P extends on the opposite side of relative wall 29 to relative path Q.

Engine 6 also comprises a tapping device 18 surrounding compressor 11 and for drawing off a quota (indicated I in FIG. 6) of the first airflow upstream from compressor 11, and feeding quota I to nozzle 15.

Fresh-air quota I thus mixes with the hot burnt gas flowing through nozzle 15 to cool the exhaust gas from opening 17 and so reduce the overall radiation emitted by helicopter 1 in the infrared frequency.

In other words, conduit 16 also functions as an ejector by activating, by means of the gas accelerated in nozzle 15, an airflow which originates in housing 23, cools transmission 9 to a certain extent, and eventually mixes with the burnt gas inside conduit 16.

In actual use, as helicopter 1 moves forward, airflow F strikes edges 30 of walls 29, and is diverted by edges 30 to form first and second airflows along respective paths P, Q.

More specifically, the first airflows flow along surfaces 32 of relative walls 29 and along the portions of walls 35 interposed between surfaces 32 and respective inlets 21, and finally through inlets 21 and along intake conduits 12 of engines 6.

Inside conduits 12, devices 18 draw off respective quotas I of the first airflows upstream from respective compressors 11, and feed them directly to nozzles 15. More specifically, the drawn-off quotas I are less than the respective remaining portions (indicated L in FIG. 6) of the respective first airflows.

The remaining portions L of the first airflows are compressed by respective compressors 11, and react with the fuel inside respective combustion chambers 13 to produce hot pressurized burnt gas, which expands inside respective turbines 14 and flows along nozzles 15 to rotate the output shafts of engines 6 about respective axes A. Transmissions 9 transmit motion from the output shafts of engines 6 to the drive shaft 10 of rotor 3.

Inside nozzles 15, the hot burnt gas mixes with the fresh-air quotas I tapped by devices 18, thus cooling the exhaust gas discharged by conduit 16 and indicated M in FIG. 6.

The second airflows flow along surfaces 31 of relative walls 29, along the portions of surfaces 53 interposed between inlets 22 and relative edges 54, and finally through inlets 22 and along conduits 55 to housings 23 of transmissions 9, where they cool transmissions 9 either directly or by means of a radiator.

The advantages of helicopter 1 according to the present invention will be clear from the above description.

In particular, edge 30 of each air intake 20 divides the airflow F on it into a first and second airflow, which reach respective inlets 21, 22 along separate paths P, Q.

As a result, air intake by conduits 12 through inlets 21 is unaffected by the airflow through inlets 22, and by which to cool housing 23 of transmission 9, over a wide range of yaw angles of helicopter 1, i.e. a wide range of angular positions of fuselage 2 with respect to axis A.

Consequently, an increase in the second airflows through inlets 22 does not reduce the corresponding first airflows, and so does not impair the efficiency of compressor 11 and therefore of engine 6.

Moreover, because inlets 22 are located on the fuselage 2 side, and inlets 21 on the opposite side to fuselage 2, the turbulence generated by aerodynamic interaction between helicopter 1 and airflow F is more predominant in the second airflows than in the first.

Paths P and Q being separate prevents this turbulence from being transmitted to the first airflows.

The first airflow along conduit 12 and predominantly drawn by compressor 11 is therefore substantially laminar, and so improves the efficiency of engines 6 over a wide range of yaw angles of helicopter 1.

In addition, since air intake by engines 6 is constant, in quantity and flow conditions, over a wide range of yaw angles of helicopter 1, engines 6 have similar operating temperatures, and can therefore be coupled in temperature to improve the overall performance of helicopter 1.

Another advantage of separating paths P and Q lies in the second airflows being undisturbed by the first, and so being substantially constant over a wide range of yaw angles of helicopter 1, thus greatly reducing the risk of in-mission overheating of transmission 9.

Walls 35, 50 having no sharp curves at respective inlets 21, 22 greatly reduces pressure losses in the first and second airflow.

Finally, air intake 20 provides, with a single device, for drawing in both first and second airflows for supplying compressors 11 of engines 6 and cooling transmissions 9 and the exhaust gas respectively.

Clearly, changes may be made to helicopter 1 as described herein without, however, departing from the scope of the present invention.

In particular, helicopter 1 may have one engine 6 and one air intake 20.

Walls 53 may have one inlet 22.

And the shape of inlets 21, 22 and conduits 12, 16 may be other than as shown.

The invention claimed is:

1. A helicopter (1) comprising:
   a fuselage (2);
   a drive (6) comprising an air intake conduit (12);
   a main rotor (3) connected functionally to said drive (6);
   a transmission (9) interposed functionally between said main rotor (3) and said drive (6) and housed in a housing (23); and
   at least one air intake (20) comprising:
      a first inlet (21) fluidly connected to said intake conduit (12);
      at least one second inlet (22) fluidly connected to said housing (23);
      a first wall (29) defining deflecting means (30) interacting, in use, with an airflow (F) to divide the airflow (F) into a first airflow and a second airflow; and
      guide means (31, 32, 37, 53) for guiding said first airflow along a first path (P) extending from said deflecting means (30) to said first inlet (21), and for guiding said second airflow along a second path (Q) separate from said first path (P) and extending from said deflecting means (30) to said second inlet (22);
      said second path (Q) extending between said first wall (29) and said fuselage (2); and
      said first path (P) extending on the opposite side of said first wall (29) to said fuselage (2).

2. The helicopter as claimed in claim 1, wherein said deflecting means (30) are defined by a free first end edge (30) of said first wall (29).

3. The helicopter as claimed in claim 1, wherein said air intake (20) comprises a second wall (35) and a third wall (50) defining said first inlet (21) and said second inlet (22) respectively; said third wall (50) extends between a first surface (31) of said first wall (29) and said fuselage (2), and said second wall (35) projects from a second surface (32), opposite said first surface (31), of said first wall (29); said guide means (31, 32, 37, 53) is defined by said first and second surfaces (31, 32) of said first wall (29), by a portion of said second wall (35) extending between said second surface (32) and said first inlet (21), and by a portion of said third wall (50) extending between said first surface (31) and said second inlet (22).

4. The helicopter as claimed in claim 3, wherein said second wall (35) comprises a first end edge (38) cooperating at least partly with said second surface (32) of said first wall (29) and a second end edge (39) opposite said second end edge (38); said first inlet (21) extending at a distance from said second surface (32) smaller than the distance between said third end edge (39) and said second surface (32).

5. The helicopter as claimed in claim 4, wherein the thickness of said second wall (35), measured perpendicularly to said second surface (32), increases in the direction from said second end edge (38) to said third end edge (39), and decreases in the direction from said third end edge (39) to said first inlet (21).

6. The helicopter as claimed in claim 3, wherein said at least one air intake (20) comprises two second inlets (22); and wherein said third wall (50) comprises a free rounded edge (54) and a third and fourth surfaces (53) converging in said rounded edge (54); said third and fourth surfaces (53) each defining one of said second inlets (22).

7. The helicopter as claimed in claim 6, wherein said rounded edge (54) of said third wall (50) is interposed between said free end edge (30) of said first wall (29) and said second inlets (22).

8. The helicopter as claimed in claim 3, wherein said first, second, and third walls (29, 35, 50) are integral with one another.

9. A helicopter comprising:
   a drive (6) comprising an air intake conduit (12);
   a main rotor (3) connected functionally to said drive (6);
   a transmission (9) interposed functionally between said main rotor (3) and said drive (6) and housed in a housing (23); and
   at least one air intake (20) comprising:
      a first inlet (21) fluidly connected to said intake conduit (12);
      at least one second inlet (22) fluidly connected to said housing (23);
      a first wall (29) defining deflecting means (30) interacting, in use, with an airflow (F) to divide the airflow (F) into a first airflow and a second airflow; and
      guide means (31, 32, 37, 53) for guiding said first airflow along a first path (P) extending from said deflecting means (30) to said first inlet (21), and for guiding said second airflow along a second path (Q) separate from said first path (P) and extending from said deflecting means (30) to said second inlet (22);

the contour of said first inlet (21) comprising a first tip portion (46), and a second arc-shaped portion (45) located on the opposite side of said first tip portion (46) to a free end edge (30) of said first wall (29);

said first tip portion (46) diverging in the direction from said free end edge (30) of said first wall (29) to said second arc-shaped portion (45).

10. A helicopter comprising:

a drive (6) comprising an air intake conduit (12);

a main rotor (3) connected functionally to said drive (6);

a transmission (9) interposed functionally between said main rotor (3) and said drive (6) and housed in a housing (23); and at least one air intake (20) comprising:

a first inlet (21) fluidly connected to said intake conduit (12);

at least one second inlet (22) fluidly connected to said housing (23);

deflecting means (30) interacting, in use, with an airflow (F) to divide the airflow (F) into a first airflow and a second airflow; and guide means (31, 32, 37, 53) for guiding said first airflow along a first path (P) extending from said deflecting means (30) to said first inlet (21), and for guiding said second airflow along a second path (Q) separate from said first path (P) and extending from said deflecting means (30) to said second inlet (22);

said drive (6) comprises:

a compressor (11) provided to draw a portion (L) of the air flowing through said first inlet (21) and said intake conduit (12);

a combustion chamber (13) in use supplied with air compressed by said compressor (11), and causing said compressed air to react with a fuel to produce high-temperature burnt gas;

a turbine (14) provided to expand said burnt gas;

a nozzle (15) for varying the speed of the burnt gas expanded in said turbine (14); and an exhaust conduit (16) located downstream from said nozzle (15) to expel said burnt gas from said helicopter (1);

said helicopter (1) comprising a tap line for drawing off a quota (I) of said first airflow upstream from said compressor (11), and feeding said quota (I) downstream from said turbine (14) to mix said quota (I) with said burnt gas from said turbine (14).

* * * * *